United States Patent [19]

Bajulaz

[11] Patent Number: 4,809,511
[45] Date of Patent: Mar. 7, 1989

[54] INTERNAL COMBUSTION ENGINE

[76] Inventor: Roger Bajulaz, 22, Ch. William Barbey, CH - 1292 Chambesy, Switzerland

[21] Appl. No.: 59,218

[22] Filed: Jun. 8, 1987

[30] Foreign Application Priority Data

Jun. 25, 1986 [CH] Switzerland .................. 2560/86

[51] Int. Cl.$^4$ .............................................. F01B 29/04
[52] U.S. Cl. ...................................... 60/712; 60/39.6
[58] Field of Search ................ 60/39.6, 39.64, 712; 123/22

[56] References Cited

U.S. PATENT DOCUMENTS

| 3,662,543 | 5/1972 | Milisavljevic | 60/39.6 |
| 4,143,518 | 3/1979 | Kellogg-Smith | 60/712 |
| 4,513,568 | 4/1985 | Bajulaz | 60/39.6 |

FOREIGN PATENT DOCUMENTS 0104541 4/1984 European Pat. Off. .

OTHER PUBLICATIONS

"The Bajulaz Cycle: a Two-Chamber Internal Combustion Engine with Increased Thermal Efficiency", SAE Technical Paper Series, No. 860534, by W. W. Yuen et al., Feb., 1986, pp. 1-10.

Primary Examiner—Stephen F. Husar
Attorney, Agent, or Firm—Young & Thompson

[57] ABSTRACT

An improved six cycle internal combustion engine is provided comprised of an engine block; a crank shaft mounted within said engine block; at least one cylinder within which a piston is slidably mounted and operably connected to said crank shaft; a valve head fixedly attached to said engine block; said valve head, piston and cylinder defining a variable volume chamber; an admission duct adapted to admit air into said variable volume chamber; an exhaust duct adapted to remove exhaust gases from said variable volume chamber; said valve head further including a preheating chamber positioned between and capable of fluid communication with said admission duct and said variable volume chamber and a combustion chamber positioned and said variable volume chamber; said valve head further including (a) at least one admission valve to control the admission of air from said preheating chamber into said variable volume chamber (b) at least one exhaust valve to control the flow of gases from said variable volume chamber into said combustion chamber, (c) means to control the entry of air into said preheating chamber from said admission duct, and (d) means to control the entry of exhaust gases into said exhaust duct from said combustion chamber, (e) said admission valve, said exhaust valve and each said control means being cooperatively engaged with at least one cam shaft driven by said crank shaft.

23 Claims, 5 Drawing Sheets

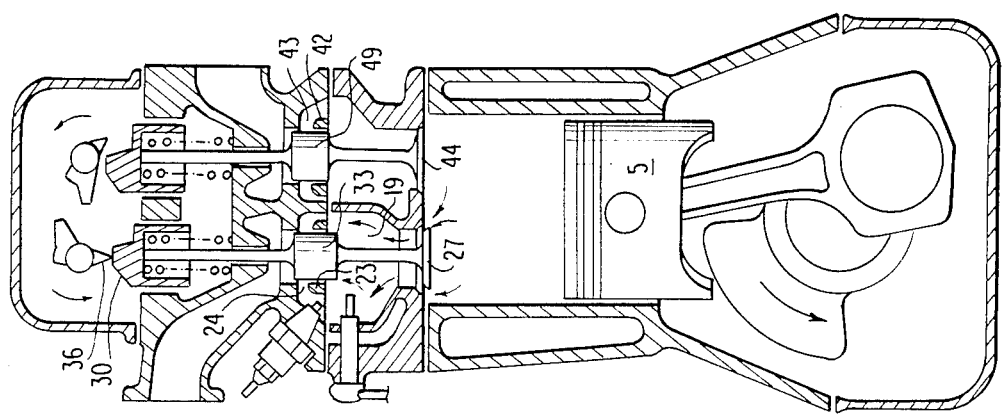
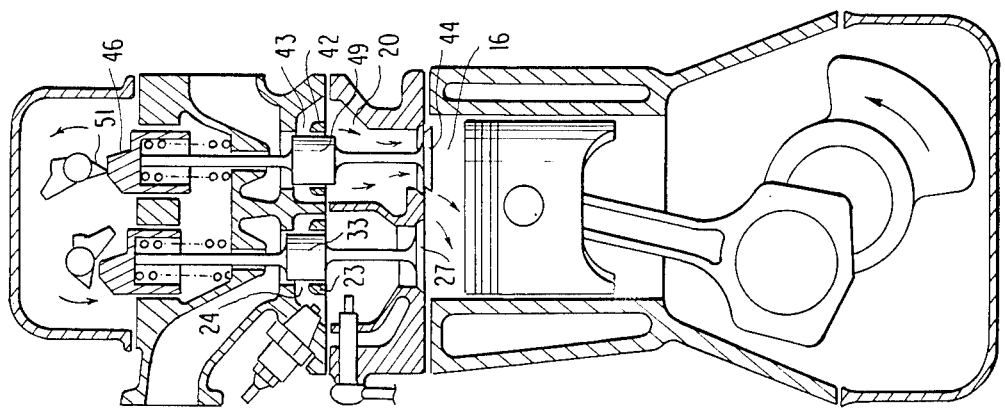
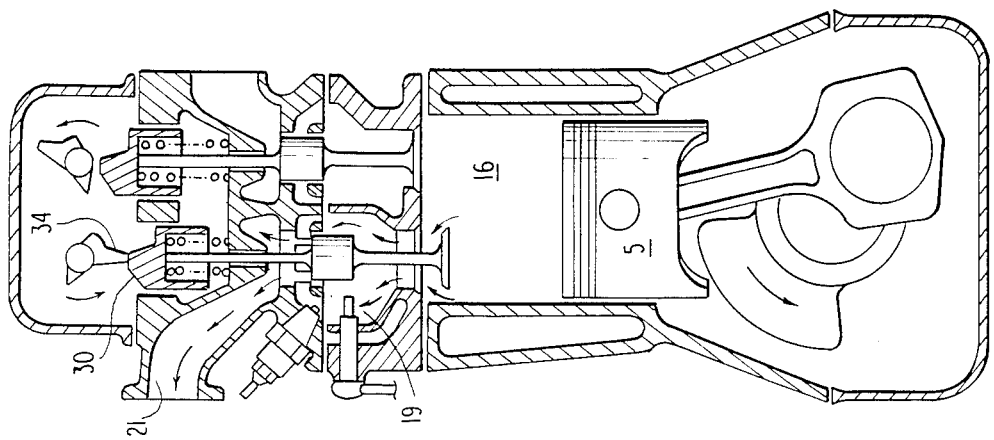

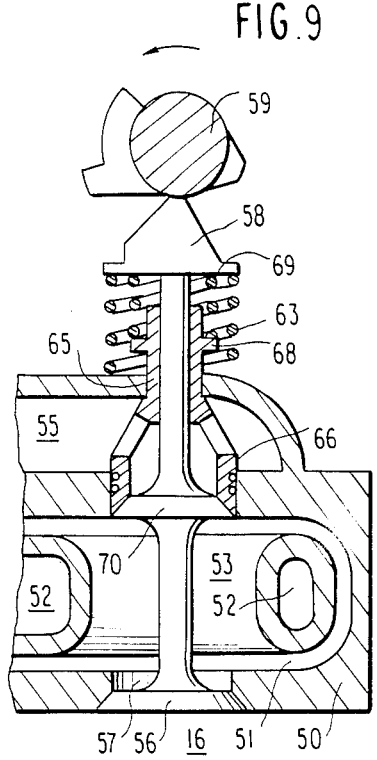
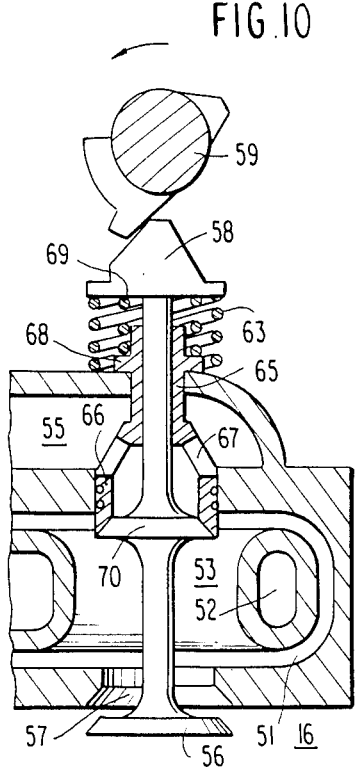
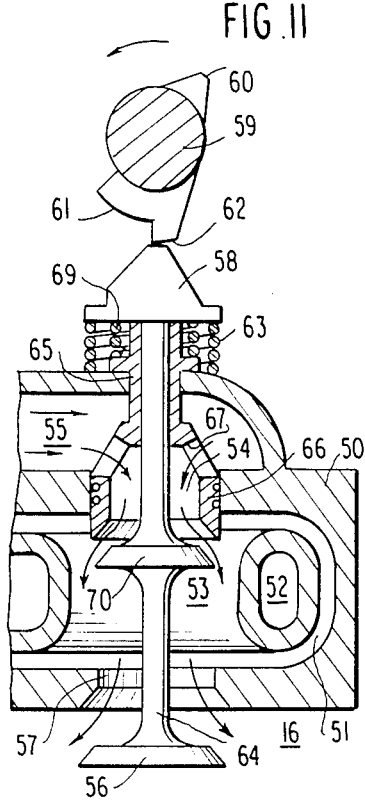
FIG.9  FIG.10  FIG.11
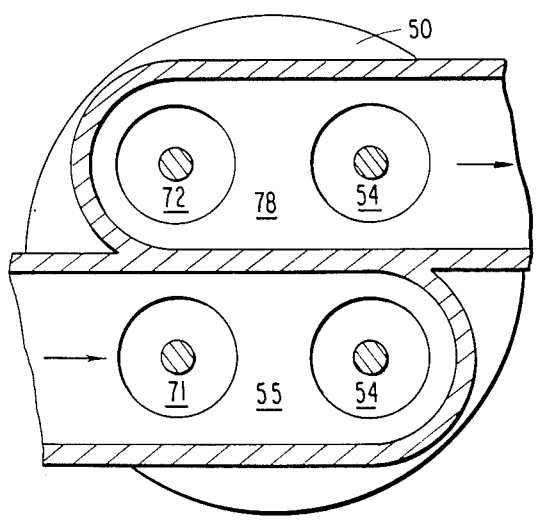
FIG.12
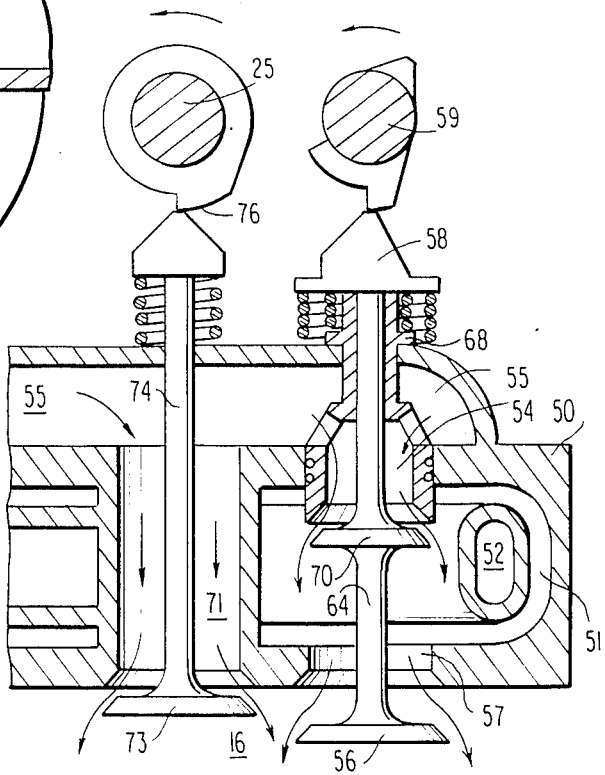
FIG.13

INTERNAL COMBUSTION ENGINE

BACKGROUND OF THE PRESENT INVENTION

The present invention relates to internal combustion engines the working cycle of which comprises six strokes or more such as described for example in the U.S. Pat. No. 4,513,568 and in the European patent application published No. 0 104 541 or in the publication of the "Society of Automotive Engineers, Inc." entitled "The Bajulaz Cycle: A Two-Chamber Internal Combustion Engine with Increased Thermal Efficiency" in the SAE Technical Paper Series No. 860534 of February 1986.

From a practical point of view, such engines suffer the inconvenience that the clearance between rotating or oscillating portions of the engine is small which can in certain instances present problems relating to excessive friction.

OBJECTS AND SUMMARY OF THE CLAIMED INVENTION

It is thus an object of the present invention to provide an internal combustion engine having a six stroke working cycle which obviates the above drawbacks, through the absence of rotative or angular movements between parts having minimal clearance between them.

The internal combustion engine of the present invention thus comprises a motor block, in which a crankshaft is rotated, including at least one cylinder in which is linearly displaced a piston connected with said crankshaft through a crank; a valve head fixed to the upper part of the motor block; the valve head, the piston and the cylinder defining a variable volume chamber connected on the one hand to at least one admission duct and on the other hand to at least one exhaust duct; the motor comprising further, for each variable volume chamber, at least one admission valve and at least one exhaust valve actuated by at least one cam shaft driven by the crank shaft.

BRIEF DESCRIPTION OF THE DRAWINGS

The Figures show schematically and by way of example different embodiments of the internal combustion engine according to the invention.

FIGS. 3 to 8 are transverse cross-sections of the engine, similar to the one of FIG. 1, but at reduced scale, showing each of the six strokes of its working cycle.

FIGS. 9 to 11 are partial cross-sections of a second embodiment of the engine corresponding respectively to the admission, the hot air expansion and the exhaust strokes respectively.

FIG. 12 is a partial top view of a third embodiment of the engine.

FIG. 13 is a view in partial cross-section of the embodiment shown at FIG. 12.

DETAILED DESCRIPTION OF THE INVENTION

Figure 1:
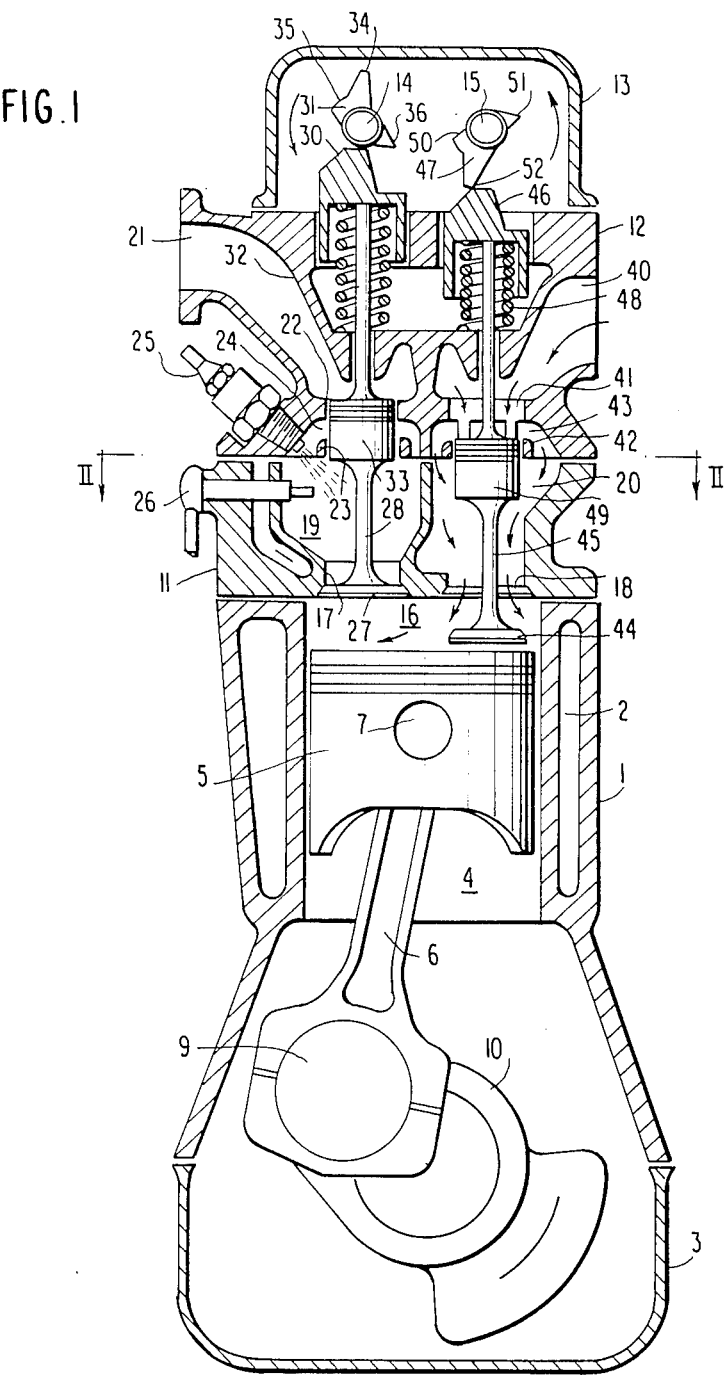
FIG. 1 is a transverse cross-section of the engine through the axis of one cylinder.
Figure 2:
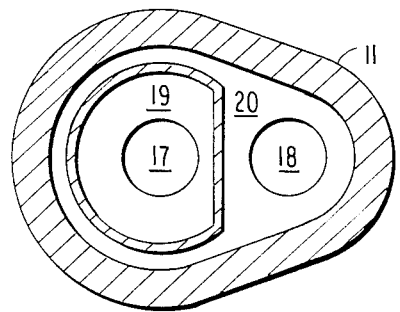
FIG. 2 is a cross-section along line II—II of FIG. 1.

The internal combustion engine shown at FIGS. 1 to 8 comprises a motor block 1, provided with a conventional cooling circuit 2, the lower end of which is closed by a motor case 3. The motor block 1 includes at least one bore comprising a cylinder 4 in which is reciprocatedly displaced in a known manner a piston 5 hinged on a crank 6 through an axle 7. Piston 5 is provided with seals of conventional design. In contrast to conventional engines, a portion of the combustion chamber is comprised of variable volume chamber 16, in the present case the volume of this chamber is substantially reduced to zero when the piston 5 is in its high position.

The lower end of the crank 6 is rotated on the crank pin 9 of a crank shaft 10 pivoted in bearings of the motor block 1, in a known manner.

A valve head comprised of a lower body 11 and an upper body 12 is attached to the upper part of the motor block 1 in a known manner. Finally, the upper part of the valve head is closed by a cam shaft cover 13.

A kinematical linkage, not shown, connects the crank shaft 10 to the cam shafts 14, 15 in order to drive these additional cam shafts at an angular speed three times less than the one of the crank shaft 10.

The cylinder 4, the piston 5 and the lower face of the lower body 11 of the valve head define a variable volume chamber 16, the upper extent of which is formed by the bottom-most surface of the lower body 11 of the valve head, including two openings 17, 18 provided with valve seats.

The opening 17 serves to permit communication between the variable volume chamber 16 and a combustion chamber 19, the combustion chamber positioned in the valve head and defined by a wall formed of a material permitting a rapid heat transfer.

The opening 18 permits communication between the variable volume chamber 16 and a preheating chamber 20 provided in the valve head and substantially totally surrounding the combustion chamber 19. The walls of the preheating chamber can be formed from an insulating material such as a ceramic, for example.

The upper body 12 of the valve head includes an exhaust duct 21 communicating with the combustion chamber 19 through an opening 22 opening into a skirt 23 coaxial to the opening 17 which connects the combustion chamber 19 to the variable volume chamber 16. This skirt 23 comprises one or several slots 24 provided in its peripheral walls and communicating with the combustion chamber 19.

An injector 25 serves to inject a combustible fuel in the combustion chamber 19 at the appropriate time in relation to the working cycle. A heating or ignition member 26, such as an ignition plug, extends into combustion chamber 19 to cause the combustion or the explosion of the combustion mixture or detonating mixture which is compressed in combustion chamber 19.

A valve 27, coaxial to the aperture 17 cooperates with a valve seat in the aperture to seal the variable volume chamber 16 from the combustion chamber 19, the supporting rod 28 of which extends through the combustion chamber 19, the skirt 23 and is guided in the upper body 12 of the valve head. The topmost end of the rod 28 is attached to a pusher 30 which cooperates with a cam 31 operatively engaged with the cam shaft 14. A spring 32 supported by the upper body 12 of the valve head acts against the pusher 30 to urge the valve 27 against its seat in a closed position.

A piston 33 engaged with the valve rod 28 and adapted to slidably reciprocate in a sealing relationship to the skirt 23 and the aperture 22 constitutes the movable portion of obturating means the skirt 23 of which constitutes the fixed part. Through a linear displacement the piston 33 either blocks or opens the slots 24 in order to block or permit communication between the combustion chamber 19 and the exhaust duct 21.

The cam 31 comprises several lateral cam edges, one of a greater extent 34 and two 35, 36 of lesser extent.

When the edges of lesser extent 35, 36 engage the pusher 30, the axial displacement transmitted to the valve rod 28 against the action of return spring 32 is sufficient for the valve 27 to open the opening 17 and permit communication between the variable volume chamber 16 and the combustion chamber; such axial movement is, however, insufficient to open the slots 24 so that the communication between the combustion chamber 19 and the exhaust duct 21 remains blocked.

It is only when the cam edge 34 of greatest extent engages the pusher 30 that the opening 17 is simultaneously opened and the slots 24 liberated by the downward movement of the piston 33, such that the chamber of variable volume 16 now communicates with the exhaust duct 21 through the combustion chamber 19.

Furthermore, the upper body 12 of the valve head also includes an admission duct 40 communicating with the preheating chamber 20 through an opening 41 in skirt 42, coaxial to the opening 18 connecting the preheating chamber 20 to the variable volume chamber 16, and constituting the fixed member of a second obturating means. The skirt 42 includes one or several slots 43 communicating with the preheating chamber 20.

A valve 44, coaxial to the opening 18 cooperates with a valve seat to seal the variable volume chamber 16 from the preheating chamber 20, the rod 45 of which extends through the preheating chamber 20, the skirt 42 and is guided in the upper body 12 of the valve head.

The upper end of the rod 45 is fixed to a pusher 46 which cooperates with a cam 47 engaged with the cam shaft 15. A spring 48 supported on the upper body 12 of the valve head acts against the pusher 46 to urge the valve 44 against its seat in closed position.

A piston 49 adapted to slidably reciprocate in sealing relationship to the skirt 42 and the opening 41 constitutes the movable portion of the second obturating means the skirt 42 of which constitutes the fixed portion. Through a linear displacement the piston 49 either blocks or opens the slots 43 so as to block or permit communication between the preheating chamber 20 and the admission duct 40.

The cam 47 comprises two lateral cam edges of lesser extent 50, 51 and a lateral cam edge 52 of greater extent.

When the cam edges of lesser extent 50, 51 engage the pusher 46 the axial displacement of the valve rod 45 against the action of its return spring 48 is sufficient to displace valve 44 to open the aperture 18 permitting communication between the variable volume chamber 16 and the preheating chamber 20; such axial displacement is, however, insufficient for the piston 49 to open the slots 43 so that communication between the preheating chamber 20 and the admission duct remains blocked.

It is only when the cam edge 52 of greatest extent engages the pusher 46 that the opening 18 is opened simultaneously, the slots 43 being liberated by the piston 49 and the variable volume chamber 16 now communicates with the admission duct 40 through the preheating chamber 20.

In such a compact and original construction, the combustion chamber 19 and preheating chambers 20 are positioned immediately on top of the variable volume chamber 16 and the latter can only be connected to the exhaust duct 21, and inlet duct 40 through the combustion chamber 19, or preheating chamber 20 respectively. This permits a complete evacuation of the gas which remains therein and enables a better engine efficiency to be achieved.

It is to be noted that the topmost surfaces of the valve 27, 44 facing the combustion chamber 19 and preheating chamber 20 are substantially equal in area to the opposing surfaces of the corresponding pistons 33, 49 so that whatever the pressure is within the combustion chamber 19, or the preheating chamber 20, respectively, no forces, due to this pressure, are communicated to the valves. Therefore, the efforts transmitted to the pushers 30, 46 and the cams 31, 47, as well as the force of the return springs 28, 48 are independent of the pressure which exists in chambers 19, 20. It is the same for the efforts transmitted to the cams 14, 15.

All or part of the valves 27, 44, and their rods 28, 45 and the pistons 33, 49 as well as the skirts 23, 42 or the valve head itself can be formed of ceramic material in a conventional manner.

FIGS. 3 to 8 depict sequentially the six strokes of a working cycle of the described engine.

Figure 3:
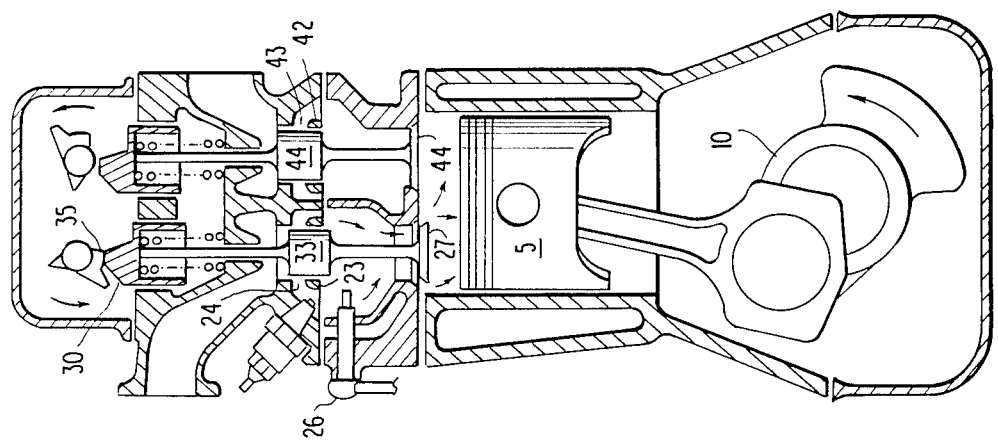
Figure 4:
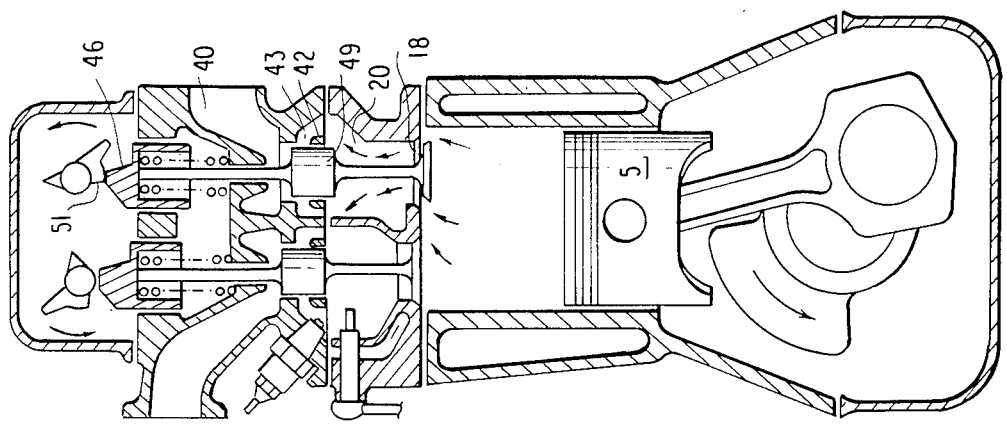
Figure 5:
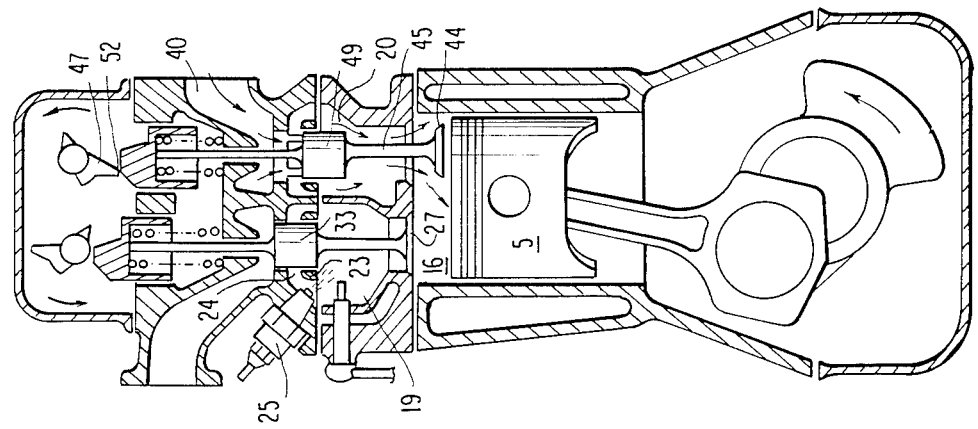

FIG. 3 shows the air admission in the variable volume chamber 16. The cam edge 52 of the cam 47 displaces completely the valve 44 and its rod 45, thus also the piston 49. The variable volume chamber 16, the volume of which increases, communicates via the preheating chamber 20 with the admission duct 40. During this time, the valve 27 remains seated and the obturation means 23, 24, 33 is closed. The combustion chamber 19 filled with compressed and preheated air (FIG. 8) is isolated and a fuel is injected through the injector 25, and the mixture is ignited.

As piston 5 reaches the lowermost portion of its stroke (FIG. 4) the pusher 46 cooperates with the cam edge 51 of lesser extent so that the opening 18 is opened but the second obturation means 42, 43, 49 is closed and seals access to the admission duct. During the ascending stroke of the piston 5, air is forced from chamber 16 and compressed in the preheating chamber 20 which is now isolated from the admission duct 40.

As piston 5 arrives at its uppermost portion of its stroke (FIG. 5) the valve 44 and the second obturation means 42, 43, 49 are closed whereas the pusher 30 is displaced by the small cam edge 35 causing the opening of the valve 27, the obturation means 23, 24, 33 remaining closed. The combustion gases coming out from the combustion chamber force the piston 5 downwardly. This is the first active stroke transmitting power to the crank shaft 10.

As piston 5 again reaches its lowermost position (FIG. 6) the pusher 30 cooperates with the cam edge 34 and the variable volume chamber 16 communicates with the exhaust duct 21 through the combustion chamber 19. During the ascending stroke of the piston 5 the combustion gases are evacuated from the chamber 16.

The piston 5 again reaches its uppermost position (FIG. 7), the valve 27 and the obturation means 23, 24, 33 is closed whereas the pusher 46 cooperates with the cam edge 51 causing the opening of the valve 44 but the obturation means 42, 43, 49 remains closed. The air contained in the preheating chamber 20 which has been heated by heat exchange through the wall separating it from the combustion chamber 19 and the pressure of which has thus increased escapes into the variable volume chamber 16 causing the downward stroke of the piston 5. This is the second active stroke, producing energy, of the cycle.

As piston 5 reaches again its lowermost position (FIG. 8) the valve 44 and the obturation means 42, 43, 49 is closed, the pusher 30 cooperates with the small cam edge 36 so that the valve 27 is opened, but that the obturation means 23, 24, 33 remains closed. Therefore during the ascending stroke of the piston 5 the preheated air is compressed into the combustion chamber 19. When the piston 5 reaches again its uppermost position, the configuration shown at FIG. 3 is repeated.

It is to be noted that during the working cycle the admitted air or air mixture twice passes through the aperture 18 of the preheating chamber 20 toward the variable volume chamber 16 and once from the variable volume chamber 16 toward the preheating chamber 20.

In the same way the air or the air mixture twice passes through the aperture 27 of the variable volume chamber 16 toward the combustion chamber 19 and once in the reverse direction from the combustion chamber 19 toward the variable volume chamber 16.

The ability to have the admitted air or air mixture alternately passing through the same valve is not found in any known engine.

In a variant one could have only one cam shaft controlling pushers 30 and 46 through the cooperative action of tippers.

In another embodiment the engine may comprise two combustion chambers each comprising a valve and obturating means as previously described. In this case, the working cycle comprises eight strokes, the cam shafts revolve four times slower than the crank shaft 10. In such an eight stroke cycle, after the exhaust of the combustion gases (FIG. 8) one inserts a new expansion stroke (FIG. 5) of the combustion gas contained in the second combustion chamber followed by a second exhaust stroke (FIG. 6) prior to the following stroke (FIG. 7) which is the expansion of the variable volume chamber 16 through the action of the heated air confined in the preheating chamber 20.

This new development and this new design of the engine having at least six strokes described in the U.S. Pat. No. 4,513,568 and the published European patent application No. 0 104 541, are particularly interesting since while permitting an increase of the efficiency of the engine its realization can be made by means of well known and used techniques and materials.

As a matter of fact, the relative movements between the pistons 5 and the cylinders 4 are linear reciprocating movements and the minimal tolerance between these parts is obtained in a known manner by means of sweeping segments and seals, the technique of which is very well known since it is used in all internal combustion engines now in use.

Similarly, the admission into, and the exhaust from the variable volume chamber 16 is made by means of valves controlled by one or several cam shafts as is traditionally done in the existing engines.

Finally, the obturation means permitting the opening and the closure of the passages between the combustion chamber 19 and the exhaust duct 21, and between the preheating chamber 20 and the admission duct 40 are also comprised of pistons sliding linearly in back and forth movements, synchroneously to the ones of the valves to which they are engaged, in skirts or sleeves.

Here also, the close tolerance between these elements, is made by means of seals and this technique which is largely used now, is known. The problems derived from the high temperature of gases are resolved by the use of ceramic pieces.

The use of cams having several extents, displaced one with the other of about 60° to 120°, presenting two different extents does not raise any particular problems.

The technical problems, and particularly the fact that the temperature of the lower body 11 of the valve head, containing the combustion chamber 19 and preheating chamber 20, can reach high values, are also solved by the use of ceramic parts which does not necessitate any lubrication and ensures a good thermal insulation.

Figure 15:
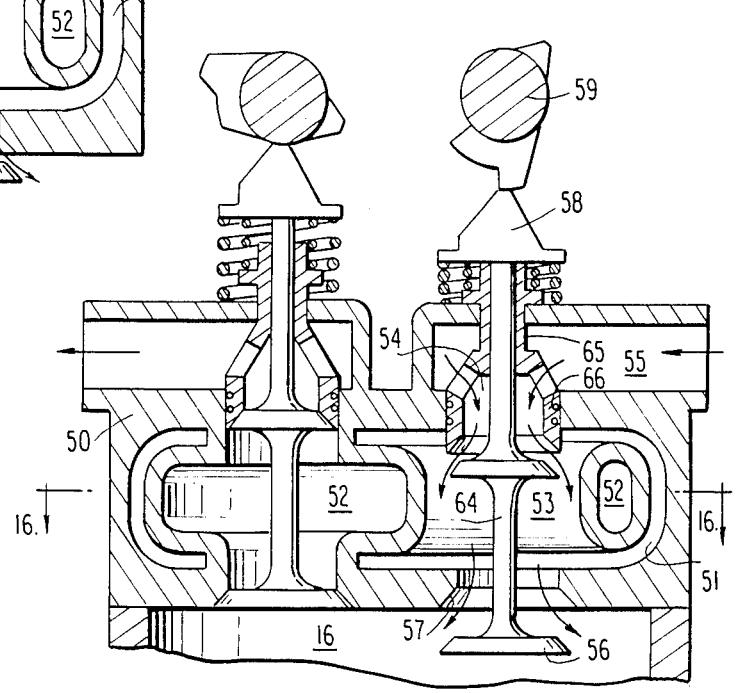
FIG. 15 depicts in vertical cross-section the entire valve head assembly of FIGS. 9–11.
Figure 16:
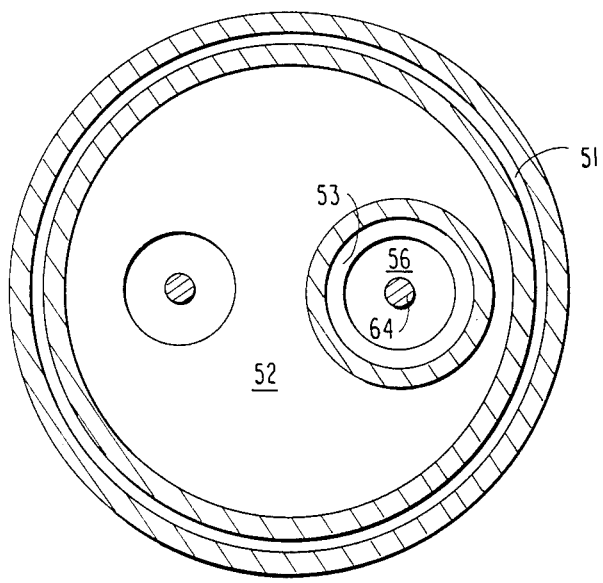
FIG. 16 depicts in horizontal cross-section the valve head assembly of FIG. 15.

FIGS. 9 to 11 show in partial cross section a second embodiment of the engine described previously in which the positioning of the preheating and combustion chambers in the valve head is different and in which the obturation means employed with the valves are also of different construction. FIGS. 15 and 16 depict this embodiment in more complete detail, with FIG. 15 depicting in cross-section the entire valve head assembly of FIGS. 9-11.

In this embodiment the valve head 50 comprises a preheating chamber 51 occupying practically the whole surface located above the variable volume chamber 16. This preheating chamber encloses a combustion chamber 52 located in said preheating chamber and comprising passages 53 permitting access to the valves and which are thus aligned on the opening 57 connecting the preheating chamber 51 and the combustion chamber 52 to the variable volume chamber and to the orifice 54 connecting this preheating chamber, and the combustion chamber 52 to the admission duct 55 and the exhaust duct respectively.

Through said placement of the preheating chamber 51 and combustion chamber 52 one obtains an optimal thermal exchange between the fluids contained in both said chambers.

The engine comprises further an admission valve 56 cooperating with a seat of the opening 57 the rod 64 of which extends through the passage 53, the opening 54 and the admission duct 55 and comprises at its free end a push member 58 cooperating with a cam 59 having three cam edges 60, 61 and 62. Two edges 60, 61 present the same amplitude whereas the edge 62 has a greater amplitude than the others as in the previously described case.

This valve is urged toward the closed position by a spring 63.

The rod 64 of the valve 56 serves as guide to a movable part of an obturation means which comprises a tubular member 65 slidably engaged with the valve rod 64 and extending through the wall of the admission duct 55 as well as cylindrical portion 66 slidably engaged with the opening 54 of the valve head 50, the close tolerance being ensured by seals. The upper part of cylindrical portion 66 includes apertures 67 permitting access to the admission duct 55 as well as access to the preheating chamber since the lower part of the cylindrical portion is open.

The tubular member 65 includes an abutment or shoulder 68 limiting the extent of its displacement downwardly. A spring 69 bearing between the push member 58 and this abutment or shoulder 68 tends to displace the movable part 65, 66 of the obturation means downwardly.

The valve rod 64 comprises further a second valve 70 cooperating with a valve seat provided at the open end of the cylindrical portion 66.

The exhaust valve, not shown, is provided in a similar fashion with a valve cooperating with an identical obturation means sliding in an opening connecting the combustion chamber 52 to the exhaust duct (not shown).

At FIG. 9 one sees the push member 58 in contact with the cam shaft, the valve 56 seals the opening 57 and the valve 70 is forced against the cylindrical portion 66 blocking any communication between the preheating chamber 51 and the admission duct 55.

When the push member 58 is actuated by one of the cam edges 60 and 61 of low amplitude, the valve 56 is displaced and opens the opening 57, setting in communication the preheating chamber 51 with the variable volume chamber 16. This corresponds to the stroke of the expansion of the preheated air. In this position, the spring 69 displaces the movable part 65, 66 simultaneously to the valve rod 64 and this part of the obturation means is in abutment against the valve 70 thus hindering any communication between the preheating chamber 51 and the admission duct 55.

When the push member 58 is actuated by the cam 62 having the largest amplitude the valve 56 is open, the abutment 68 limits the axial displacement of the part 65, 66 of the obturation device so that the valve 70 leaves its seat and opens a passage connecting the preheating chamber 51 to the admission duct 55 (FIG. 11). In this position the variable volume chamber 16 is connected, through the preheating chamber, to the admission duct.

The operation of the exhaust valve and its obturation means is similar.

This presents certain advantages which are the realization of communication which is relatively direct between the admission duct and the variable volume chamber. The absence of slots ensures better working of the seals between the valve head 50 and the cylindrical portion 66, these seals being always in abutment. Furthermore, the total stroke of the valve is less than in the preceding described system.

A particularity of this realization is that the valve rod 64 controls two valves 56 and 70.

To increase the performance and the turn numbers it is necessary to obtain admission of air and a gas exhaust of a great volume in a very short time. The embodiment shown at FIGS. 12 and 13 relates to this object, and includes in addition to the elements described in reference to FIGS. 9 and 11, direct access between the variable volume chamber 16 and the admission duct 55 and exhaust duct 78.

Each of these connections comprises a channel 71, 72 directly connecting the variable volume chamber 16 to the admission duct 55 and the exhaust duct 78, respectively.

The channels 71, 72 comprise on the side of the variable volume chamber 16 a valve head cooperating with a valve 73 engaged with a rod 74 and actuated by a second cam shaft 75 through the action of cams 76 having only one cam edge. In such an embodiment during the exhaust stroke and the admission stroke the variable volume chamber 16 is connected to the exhaust duct and admission duct respectively through channels 72, 71 and simultaneously in the manner described in the second embodiment.

The whole passage cross section is increased causing an aspiration and an exhaust of a gas which is more rapid and with less loss.

Figure 14:
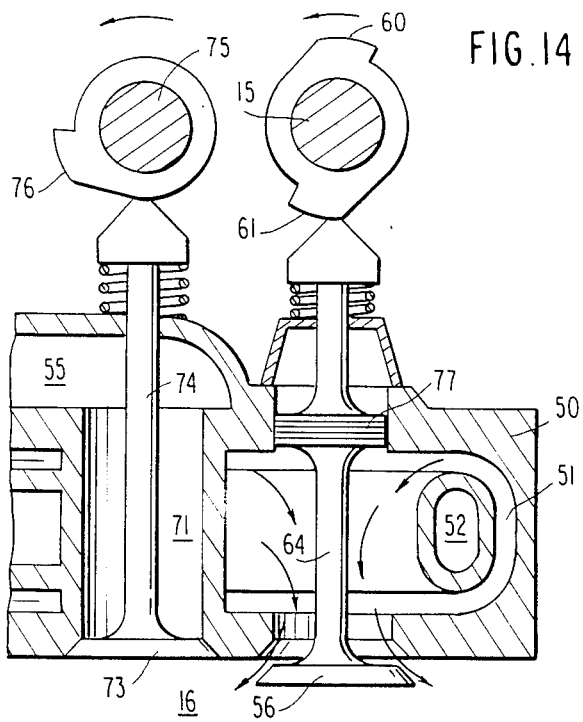
FIG. 14 is a view in partial cross-section of a variant of the embodiment shown at FIGS. 12 and 13.

In a variant of this third embodiment shown schematically at FIG. 14, the engine comprises an admission valve and an exhaust valve identical to valves 73, 74 but the valve 56 of this engine does not include any obturation means which blocks or permits communication between the admission duct and the preheating chamber and the exhaust duct and the combustion chamber. In place of this obturation means the rod 64 and the valve 56 cooperatively engage a piston 77 blocking the aperture 54 irrespective of the position of the valve 56. In this embodiment, the cam shaft 15 comprises only two cam edges 60, 61 of equal extent. The piston 77 equilibrates the pressure transmitted to the rod of the valve 64 and thus to the cam shaft 15. In such an engine one has four valves placing in communication the variable volume chamber alternatively with the admission duct, the preheating chamber, a combustion chamber and the exhaust duct. In this variant the cam shaft 15 which comprises two identical cams displaced by 180° can turn twice as quickly and would comprise only one cam. Instead of turning three times less rapidly than the motor shaft as in the preceding embodiment it would turn 1.5 times less than the motor shaft.

Among the advantages offered by the six stroke engines of this design, one of the most important is that they are multifuel; that is to say that they can use any type of fuel, even several fuels alternatively and indifferently without any change of setting. Among those fuels which are usable in such engines are included gasoline or lead free gasoline, diesel, several heavy oils, alcohol, kerosene, natural or industrial gas and even powder fuels.

One interesting particularity of these engines comes from the fact that the explosion and/or the combustion of the fuel occurs in the combustion chamber which is closed and the volume of which is fixed. Therefore neither the time of the ignition nor the duration of the combustion have any importance for the working of the engine. One can thus use a fuel having a low octane rating and still have high compression rates. In such engines the auto-ignition phenomena does not have any adverse consequence. One can thus use diesel fuel with a lower compression rate than in the conventional diesel motors.

One can also use fuel having a slow combustion since the duration of the total combustion extends on a more important time interval, at least during one-third of the complete cycle. Furthermore, the combustion chamber remains during the whole cycle at a high temperature and its walls remain permanently at the incandescent state, which facilitates greatly the total combustion of the fuels.

Such particularity of the six stroke motor is to be particularly emphasized since it is of the greatest economic importance, and permits better efficiency to be obtained than the four stroke motors while using fuels of less quality or which are even not usable in conventional internal combustion engines.

It is necessary finally also to point out that the herein described engine the close tolerance problems identified above are totally solved since such tolerance needs to be maintained only between parts which are displaced linearly with respect to the other and which are permanently in contact. The realization of such close tolerance may be addressed by well known techniques in existing engines.

What is claimed:

1. An internal combustion engine comprising:
   an engine block;
   a crank shaft mounted within said engine block;
   at least one cylinder within which a piston is slidably mounted and operably connected to said crank shaft;
   a valve head fixedly attached to said engine block;
   said valve head, piston and cylinder defining a variable volume chamber;
   an admission duct adapted to admit air into said variable volume chamber;
   an exhaust duct adapted to remove exhaust gases from said variable volume chamber;
   said valve head further including a preheating chamber positioned between said admission duct and said variable volume chamber and adapted to permit fluid communication therebetween and a combustion chamber positioned between said exhaust duct and said variable volume chamber and adapted to permit fluid communication therebetween;
   said valve head further including:
   (a) at least one admission valve to control the admission of air from said preheating chamber into said variable volume chamber,
   (b) at least one exhaust valve to control the flow of gases from said variable volume chamber into said combustion chamber,
   (c) means to control the entry of air into said preheating chamber from said admission duct, and
   (d) means to control the entry of exhaust gases into said exhaust duct from said combustion chamber,
   (e) said admission valve, said exhaust valve and each said means being cooperatively engaged with at least one cam shaft driven by said crank shaft.

2. The internal combustion engine of claim 1 wherein said combustion chamber and said preheating chamber are positioned directly above said variable volume chamber.

3. The internal combustion engine of claim 2 wherein said admission and exhaust ducts are positioned directly above said preheating and combustion chamber, respectively.

4. The internal combustion engine of claim 3 wherein each said control means comprises a control piston adapted to slidably reciprocate in sealing relationship to entry ports between said admission and exhaust ducts and said preheating and combustion chambers, respectively.

5. The internal combustion engine of claim 4 wherein each said control piston and each respective admission and exhaust valve are attached to a common valve rod, with each said control piston being cooperatively engaged with said at least one cam shaft by means of a pushrod.

6. The internal combustion engine of claim 5 further including spring biasing means to urge said admission and exhaust valves toward a closed position by action upon each said pushrod.

7. The internal combustion engine of claim 5 wherein said at least one cam shaft includes a cam having three cam surfaces, two of said cam surfaces being of lesser extent and one of said cam surfaces being of greater extent than the other two.

8. The internal combustion engine of claim 5 wherein the cross-sectional area of said control piston is substantially equal to the cross-sectional area of each said respective admission and exhaust valves.

9. The internal combustion engine of claim 5 wherein each said control piston is so configured and so positioned with respect to said admission or exhaust valve on said common valve rod that each said valve may be opened while said control piston either blocks said access ports to said admission or exhaust ducts or permits communication between said admission or exhaust ducts and said preheating and combustion chambers, respectively.

10. The internal combustion engine of claim 1 wherein at least one said control means comprises:
   a tubular member adapted to slidably reciprocate in sealing relationship within an opening in an upper portion of each said preheating or combustion chambers, said tubular member having an open-ended bottom portion which opens into said chamber and an upper portion which extends into said admission or exhaust duct, said upper portion including access ports which permit communication between said admission or exhaust ducts and the respective preheating or combustion chambers through the interior of said tubular member, said open-ended bottom portion of said tubular member including a valve seat, and
   a sealing valve configured to cooperatively engage said valve seat of said tubular member in sealing relationship, said sealing valve and said admission or exhaust valve being attached to a common valve rod slidably engaged within said tubular member, with each said valve being cooperatively engaged with said at least one cam shaft by means of a pushrod.

11. The internal combustion engine of claim 10 wherein each said control means is comprised of said tubular member and corresponding sealing valve.

12. The internal combustion engine of claim 11 wherein said combustion chamber and said preheating chamber are positioned directly above said variable volume chamber.

13. The internal combusition engine of claim 12 wherein said admission and exhaust ducts are positioned directly above said preheating and combustion chambers, respectively.

14. The internal combustion engine of claim 10 further including spring biasing means to urge said admission or exhaust valves and said sealing valve toward a closed position by action upon each said pushrod.

15. The internal combustion engine of claim 10 wherein said at least one cam shaft includes a cam having three cam surfaces, two of said cam surfaces being of lesser extent and one of said cam surfaces being of greater extent than the other two.

16. The internal combustion engine of claim 10 wherein the cross-sectional area of said sealing valve is substantially equal to the cross-sectional area of said admission or exhaust valve.

17. The internal combustion engine of claim 10 wherein said tubular member is so configured and so positioned with respect to said admission or exhaust valve and said sealing valve that each said admission or exhaust valve may be opened while said sealing valve either blocks communication through said access ports to said admission or exhaust ducts or permits access between said admission or exhaust ducts and said preheating and combustion chambers, respectively.

18. An internal combustion engine comprising:

an engine block;

a crank shaft mounted within said engine block;

at least one cylinder within which a piston is slidably mounted and operably connected to said crank shaft;

a valve head fixedly attached to said engine block;

said valve head, piston and cylinder defining a variable volume chamber;

an admission duct adapted to admit air directly into said variable volume chamber;

an exhaust duct adapted to remove exhaust gases directly from said variable volume chamber;

said valve head further including a preheating chamber capable of fluid communication with said variable volume chamber and a combustion chamber capable of fluid communication with said variable volume chamber;

said valve head further including:

(a) at least one admission valve to control the admission of air from said admission duct into said variable volume chamber, (b) at least one exhaust valve to control the flow of gases from said variable volume chamber into said exhaust duct, (c) means to control the entry of gases into said preheating chamber from said variable volume chamber, and (d) means to control the entry of gases into said variable volume chamber from said combustion chamber, (e) said admission valve, said exhaust valve and each said control means being cooperatively engaged with at least one cam shaft driven by said crank shaft.

19. The internal combustion engine of claim 18 wherein said combustion chamber and said preheating chamber are positioned directly above said variable volume chamber.

20. The internal combustion engine of claim 18 wherein said admission and exhaust ducts are positioned directly above said variable volume chamber.

21. The internal combustion engine of claim 18 wherein said exhaust valve, said admission valve and each said control means are attached to a valve rod, with each said valve rod being cooperatively engaged with said at least one cam shaft by means of a pushrod.

22. The internal combustion engine of claim 21 further including spring biasing means to urge said admission and exhaust valves and said control means toward a closed position by action upon each said pushrod.

23. The internal combustion engine of claim 21 wherein said at least one cam shaft cooperatively engaged with each said control means includes a cam having two cam surfaces of equal extent.

* * * * *